(12) United States Patent
Damen (10) Patent No.: US 10,635,574 B1
(45) Date of Patent: Apr. 28, 2020

(54) SCREENSHOT TESTING OF APPLICATIONS ON WINDOWS DESKTOP ENVIRONMENTS

(71) Applicant: Login VSI B.V., Amsterdam (NL)

(72) Inventor: Dennis Damen, Doetinchem (NL)

(73) Assignee: LOGIN VSI B.V., Amsterdam (NL)

( * ) Notice: Subject to any disclaimer, the term of this patent is extended or adjusted under 35 U.S.C. 154(b) by 0 days.

(21) Appl. No.: 16/182,314

(22) Filed: Nov. 6, 2018

(51) Int. Cl.
*G06F 11/36* (2006.01)
*G06N 3/08* (2006.01)

(52) U.S. Cl.
CPC ...... *G06F 11/3664* (2013.01); *G06F 11/3668* (2013.01); *G06F 11/3692* (2013.01); *G06N 3/08* (2013.01)

(58) Field of Classification Search
CPC .......................... G06F 11/3664; G06F 11/3668
See application file for complete search history.

(56) References Cited

U.S. PATENT DOCUMENTS

| | | | | |
|---|---|---|---|---|
| 5,335,342 | A * | 8/1994 | Pope ............... | G06F 11/3672 714/38.13 |
| 8,296,445 | B1 * | 10/2012 | Hackborn ......... | G06F 11/3664 709/228 |
| 9,213,625 | B1 * | 12/2015 | Schrage ........... | G06F 11/3688 |
| 9,600,400 | B1 * | 3/2017 | McDowell ........ | G06F 11/3664 |
| 9,946,638 | B1 | 4/2018 | Yuan et al. | |
| 2003/0185446 | A1 * | 10/2003 | Huang .............. | G06T 7/001 382/218 |
| 2003/0185447 | A1 * | 10/2003 | Huang .............. | G06T 7/001 382/218 |
| 2005/0204343 | A1 | 9/2005 | Kisamore et al. | |
| 2014/0105491 | A1 * | 4/2014 | Hayek .............. | G06K 9/6202 382/165 |
| 2014/0189576 | A1 | 7/2014 | Carmi | |
| 2015/0135100 | A1 | 5/2015 | Bentrup | |
| 2015/0347284 | A1 * | 12/2015 | Hey ................. | G06F 11/3692 717/125 |
| 2016/0117566 | A1 | 4/2016 | Danko | |
| 2017/0031808 | A1 * | 2/2017 | Gillaspie .......... | G06F 11/3692 |
| 2018/0060222 | A1 * | 3/2018 | Kogan .............. | G06F 8/70 |
| 2019/0050323 | A1 * | 2/2019 | Kogan .............. | G06F 11/3688 |

FOREIGN PATENT DOCUMENTS

WO 2017123203 A1 7/2017

OTHER PUBLICATIONS

International Search Report and Written Opinion dated Feb. 11, 2020 in International Patent Application No. PCT/US2019/059856.

* cited by examiner

*Primary Examiner* — Phillip H Nguyen
(74) *Attorney, Agent, or Firm* — Vierra Magen Marcus LLP (57) ABSTRACT

A method is disclosed for testing launched applications on a desktop environment. The method captures a screenshot from the launched application. The screenshot may then be analyzed to determine whether it is a modal screenshot or a clean screenshot. In the event the screenshot is determined to be a modal screenshot, the modal screenshot may be classified, and, if classified, information may be sought to resolve the problem with the modal screenshot. In the screenshot is determined to be a clean screenshot, the clean screenshot is evaluated against stored reference screenshots to identify a match.

23 Claims, 7 Drawing Sheets

*Fig. 3*
*(Step 236)*

SCREENSHOT TESTING OF APPLICATIONS ON WINDOWS DESKTOP ENVIRONMENTS

BACKGROUND

Enterprises run large numbers of desktops (real or virtual through a datacenter), each typically having a number of different desktop applications. It is a cumbersome but necessary task to keep each of these desktop applications on each desktop running and updated. This task typically involves testing a range of program features for each application on each desktop. This process also needs to be repeated periodically, for example each time there is an application upgrade or a change to the operating system.

DETAILED DESCRIPTION

The present technology will now be described with respect to the figures, which in general relate to a system and method for testing the operation of a number of enterprise software applications on a number of desktops. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
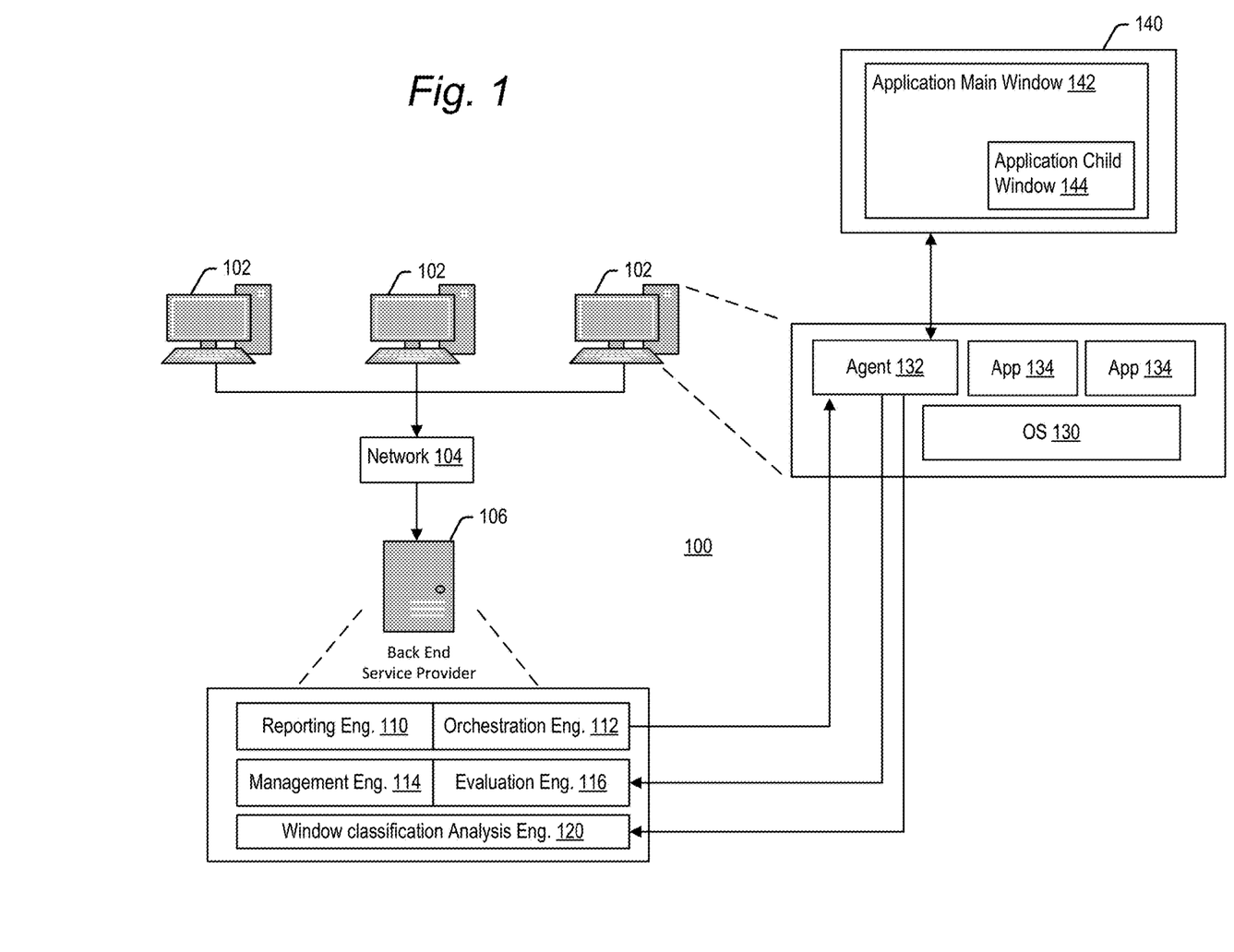
FIG. 1 is a block diagram of a network architecture on which the present technology may be implemented.

Referring to FIG. 1, there is shown a high level block diagram of a network architecture 100 in which the present technology may be implemented. In one configuration, the architecture may include a number of desktop computing devices 102, referred to at times herein as simply desktops 102. In one embodiment, the desktops 102 may be virtualized Windows desktops, for example either VDI or SBC, hosted in a datacenter to end users. These virtual desktops may be hosted in the central datacenter and accessed by users remotely through a remote display protocol over a network 104 such as a LAN, WAN, mobile broadband and the Internet. Both the VDI and SBC desktops run on shared server hardware in the datacenter. A hypervisor creates and runs virtual machines in the datacenter, and makes it possible to run multiple virtual instances of a Windows desktop.

The desktops 102 may alternatively operate directly within an enterprise, as opposed to within a datacenter. In such embodiments, the desktops 102 may be physical Windows desktop machines, instead of virtual desktops, connected to a network 104. FIG. 1 shows three desktops 102 for illustrative purposes, but there may be more or less desktops 102 in further embodiments.

As illustrated with respect to one of the desktops 102, each desktop 102 may include an operating system (OS) 130, and a number of software applications 134 stored in memory and executed by a processor on the desktops 102. A sample computer architecture providing more detail regarding the memory and processor is described below with respect to FIG. 6. In accordance with aspects of the present technology, each desktop 102 may further include an application test agent 132 stored in memory and executed by the processor. The function of the application test agent 132 is explained below.

The architecture 100 may further include a service provider 106 including one or more servers operatively connected to the desktops 102 via network 104. The one or more servers of service provider 106 include a number of software engines stored in memory and executed by one or more processors on the one or more servers. The software engines may include a reporting engine 110, an orchestration engine 112, a management engine 114, an evaluation engine 116 and a window classification analysis engine 120.

The orchestration engine 112 is responsible for generating one or more groupings of software applications, referred to herein as application recipes, or simply recipes. In an enterprise, different desktops 102 may execute different groups of applications 134. For example, a first desktop 102 may be used within a finance department of the enterprise, and execute software applications 134 pertaining to finance. As one of several examples, these applications may include invoice generation and tracking software, Excel® spreadsheet software, Word® word-processing software and Adobe PDF® document formatting software. This particular recipe of software applications is provided by way of example only. As such, a first recipe may be created by a user, including a customized grouping of applications pertaining to finance.

A second desktop 102 may be used within an engineering department of the enterprise, and execute software applications 134 pertaining to engineering. As one of several examples, these applications may include CAD® drawing software, PowerPoint® presentation software, Word® word-processing software and Adobe PDF® document formatting software. This particular recipe of software applications is provided by way of example only. As such, a second recipe may be created by a user, including a customized grouping of applications pertaining to engineering.

A third desktop 102 may be used within an IT department of the enterprise, and execute software applications 134 pertaining to software and networking operations of the enterprise. As one of several examples, these applications may include Login VSI application testing and benchmarking software, a network management tool and an operating system management tool. This particular recipe of software applications is provided by way of example only. As such, a third recipe may be created by a user, including a customized grouping of applications pertaining to IT.

There may be a wide variety of additional or alternative recipes that may be generated, depending on the nature and function of the enterprise. Each recipe in the embodiment described above includes one or more software applications which are related to each other based on an enterprise department in which the applications would typically be used. It is understood that recipes of applications may be generated based on other commonalities to each other. For example, the recipes may be based on the size or processing requirements of the applications within the one or more recipes. As a further example, recipes may include applications from the same software provider, e.g., all enterprise applications within the Microsoft Office Suite of applications may be grouped into a single recipe. Other commonalities are contemplated for the selection of software applications into a given recipe.

A user defines which applications to include in the one or more recipes using the management engine 114. The orchestration engine remotely controls the agents 132 on the various desktops 102, and schedules test runs and instructs the desktops 102 as to which recipe to execute. A desktop 102 may launch the applications in a recipe serially one at a time. While there are advantages to including the management engine 114 for grouping applications into recipes depending on a commonality of the applications, it is understood that the management engine 114 may be omitted in further embodiments. In such embodiments, the service provider may simply send a command to the application test agent 132 to launch the applications resident on a given desktop.

The application test agent 132 will request recipes generated by the orchestration engine 112 from the service provider 106. Upon receiving a recipe, the application test agent 132 on desktop 102 will launch applications in the recipe for the purpose of capturing and returning to service provider 106 either a clean screenshot or a modal screenshot. In particular, upon launching an application, the application test agent will capture a screenshot 140 as shown in FIG. 1. The screenshot 140 may include an application main window 142, and possibly one or more application child windows 144. Depending on the content of the main window 142, and (if present) the content of the one or more child windows 144, the present technology determines whether the captured screenshot 140 is a clean screenshot or a modal screenshot.

As used herein, a clean screenshot is a screenshot of a homepage including one or more windows generated by an application that has started up normally and correctly. The application has progressed through any introductory windows and is ready for user interaction in the use of the application. Instead of a clean screenshot, a launched application may instead generate a modal screenshot. As used herein, a modal screenshot is a screenshot generated upon launch of an application that blocks access to other windows and requires additional information, user input or other correction before the user can interact with the applications main window.

The application test agent 132 uploads to the service provider screenshots 140 from launched applications in a recipe for a given desktop 102. As noted, these screenshots 140 may either be clean screenshots or modal screenshots. Where a screenshot 140 is a modal screenshot, the window classification analysis engine 120 attempts to classify the modal window(s) and, if classified, to determine if an issue or problem presented in a modal window may be resolved. Additional details on the window classification analysis engine 120 are provided below with reference to FIGS. 2A, 2B, 3 and 5. On the other hand, where a screenshot 140 is a clean screenshot, the evaluation engine 116 performs a comparison of the clean screenshot 140 against reference screenshots stored in one or more servers of the service provider 106 to evaluate whether the application has started correctly and as expected. Additional details on the evaluation engine 116 are provided below with reference to FIGS. 2A, 2B and 4.

The one or more servers of service provider 106 may further run a reporting engine 110. The reporting engine 110 is provided to generate reports regarding which applications are running correctly and which are not on the one or more desktops 102.

Operation of the present technology, including the operation and interaction of application test agent 132 and the various engines of the service provider 106, will now be explained with reference to the flowcharts of FIGS. 2A to 5. The following describes the operations with respect to one of the desktops 102, but it is understood that the following description may apply to any or all of the desktops 102.

Figure 2A:
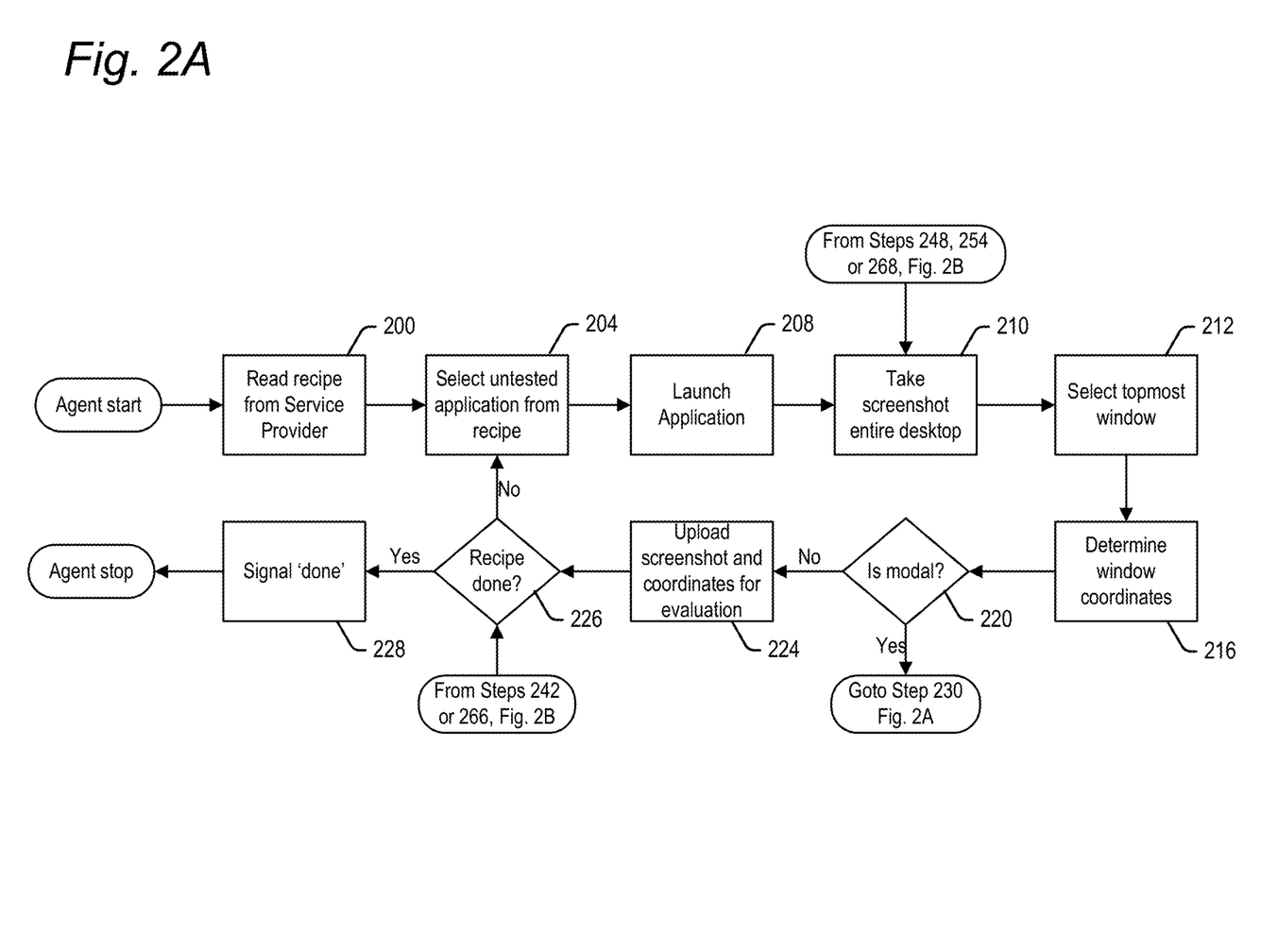
FIGS. 2A and 2B are a flowchart illustrating the steps in the operation of the present technology.

In step 200, the software testing agent 132 contacts the service provider 106 and retrieves the recipe to be tested by the desktop 102. The agent 132 selects an untested application from the recipe in step 204 and launches the application in step 206. As noted, in embodiments, the agent 132 may launch applications from a selected recipe serially one at a time.

In step 210, the agent takes a screenshot of the entire desktop, such as for example screenshot 140 shown in FIG. 1. The agent further captures the coordinates of any windows (142, 144) on the desktop. In particular, the screenshot 140 is merely a bitmap, and the context of any windows on the screenshot will be lost once captured. By recording window coordinates, the engines of the service provider are able to refer back to a particular window for analysis, such as for example by the evaluation engine 116 or window classification analysis engine 120, as explained below. The starting coordinates of a corner of a window, and the size of a window, may be stored in association with the screenshot.

In step 212, the agent selects a window displayed in the captured screenshot and in step 216, the agent 132 determines the coordinates (possibly corner and size) of the selected window. Where there are multiple windows in a captured screenshot, the agent may select a topmost window. The topmost window may be a currently-selected window covering one or more other windows on the user interface.

In step 220, the agent 132 determines whether a screenshot is a modal screenshot. The agent 132 is able to determine, for example from the Windows API, that a window is modal based on the properties of the window object. If a window is determined to be modal, the window is passed to the windows classification analysis engine 120 for analysis and classification. In particular, any text from the screenshot is identified in step 230 (the flowchart of FIG. 2A is continued on FIG. 2B). Thereafter, in step 232, the agent uploads the modal screenshot, together with any window coordinates and identified text, to the service provider 106 for analysis by the window classification analysis engine 120.

Figure 2B:
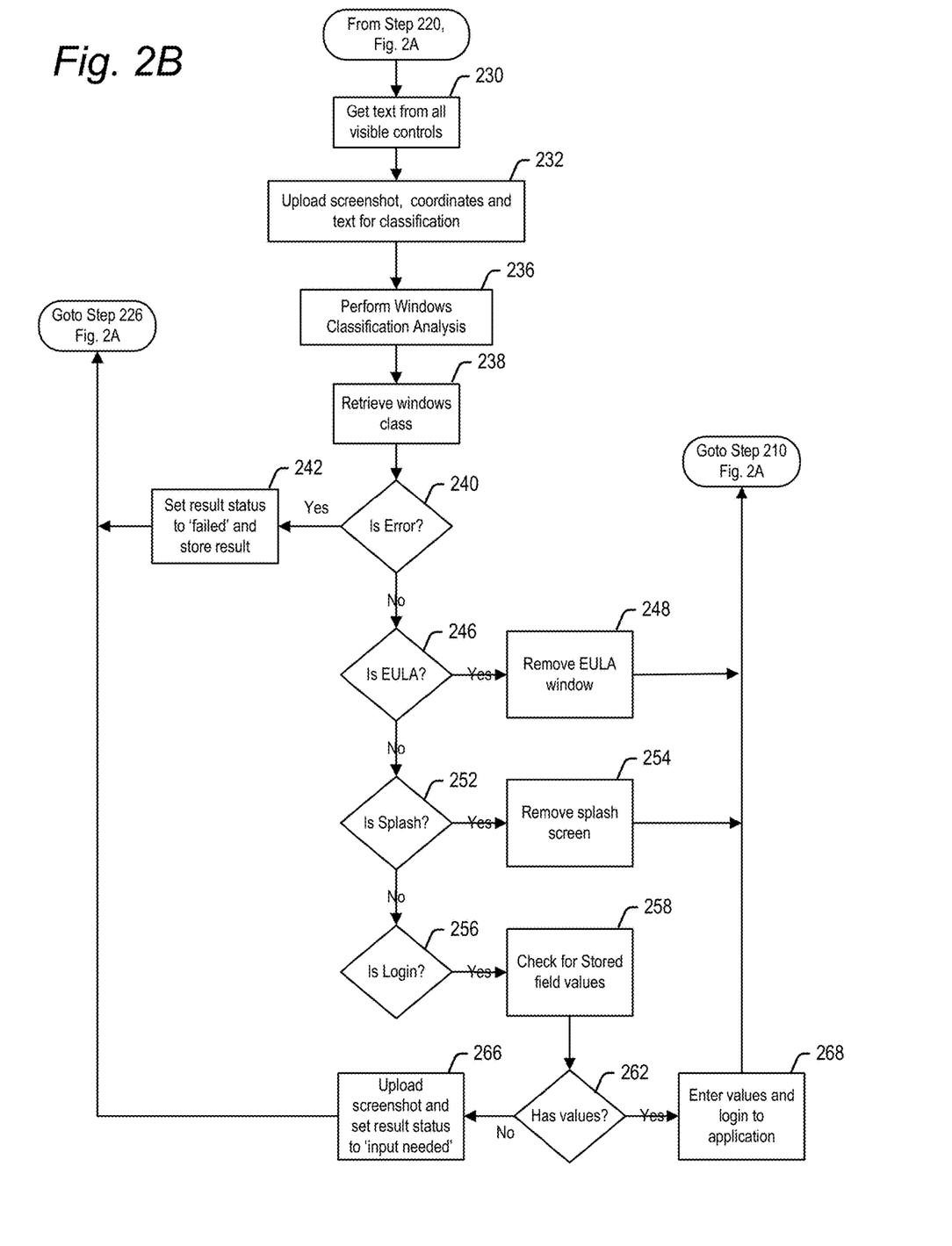

In step 236, the window classification analysis engine 120 analyzes the modal screenshot received in step 232 to attempt to classify the modality of the screenshot. In particular, if the window classification analysis engine can classify the modal window, it may be able to determine what information is need and can be provided (either automatically or by requesting input from a user) so that this information can be provided to the application. If the information is successful in clearing the modality, operation can be returned to the agent 132 at the desktop, the application can be retested and ideally a clean screenshot is then obtained. Further details of the operation of the window classification analysis engine 120 in step 236 will now be described with respect to the flowchart of FIG. 3.

Figure 3:
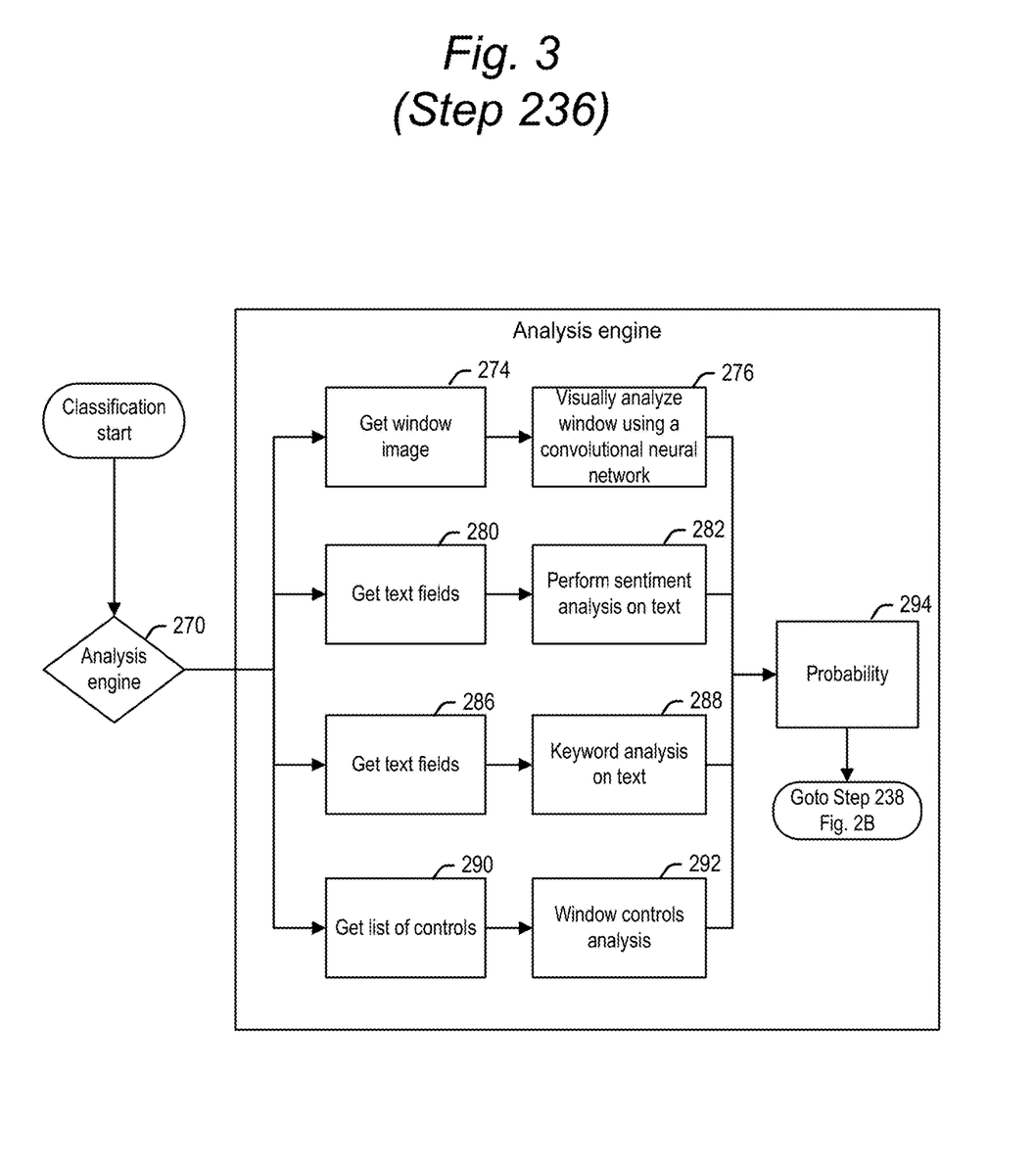
FIG. 3 is a flowchart illustrating further detail of the operation of the analysis engine of step 236 according to embodiments of the present technology.

The modal screenshot is passed to the window classification analysis engine 120 in step 270. The engine 120 may employ various heuristic techniques for analyzing the modal screenshot. For example, in step 274, the engine 120 identifies one or more windows in the modal screenshot from the received coordinates, and the windows are analyzed in step 276 using an artificial intelligence (AI) algorithm. In examples, the AI algorithm may comprise a deep neural network such as for example a convolutional neural network. The AI algorithm may have an input layer receiving various attributes of the bitmap image from the identified windows in the modal screenshot. The attributes from the input layer may be processed in multiple intermediate layers to an output layer predicting an identity of the modal window as one of several known modal windows which may come up in the execution of a software application. These modal windows may for example include a window displaying a runtime error (the application did not launch properly), or any of various pop-up windows, menus or text boxes.

As is known, the AI algorithm may be initially trained using, e.g., thousands of images of intermediate application pages, pop-up windows and error messages as controls, and adjusting the coefficients within the intermediate layers depending on whether the output layer correctly identifies the known image fed to the input layer. The AI algorithm may additionally be trained over time by comparing the correct identity of an uploaded modal window against the predicted identity in the output layer, and adjusting coefficients within the intermediate layers accordingly. After a period of training, the AI algorithm is able to predict if a window presents a EULA message, logon screen, error message, etc., even where the AI engine has not encountered the specific user interface shown in the modal screenshot.

In addition to or instead of processing the modal window by an AI algorithm, the window classification analysis engine 120 may receive the identified text from the screenshot in step 280 and perform a sentiment analysis on the text in step 282. The sentiment analysis may use natural language processing, text analysis, computational linguistics and/or other techniques to identify negative statements or sentiments in the text. Such negative statements or sentiments tend to indicate an error message or identification of a problem in the application being run.

In addition to or instead of processing the modal window by an AI algorithm and/or sentiment analysis, the window classification analysis engine 120 may receive the identified text from the screenshot in step 286 and perform a keyword analysis on the text in step 282. The keyword analysis may search the text for certain keywords. These keywords, when found, may be predictive of the classification of modal screenshot. For example, identification of words such as "error," "user ID," "user identification," "password," "not found" may each be used in predicting the type of modal window that was captured in the modal screenshot. These keywords may be predefined by an administrator of the window classification analysis engine 120 and/or they may be supplied by the AI algorithm.

In addition to or instead of processing the modal window by an AI algorithm, sentiment analysis and/or keyword analysis, the window classification analysis engine 120 may receive a list of controls from the screenshot in step 290 and perform a window control analysis on the text in step 292. Certain modal windows present known controls to users. For example, one type of modal window which an application may generate is a request for a user to provide a user name and password to access an application. In this case, the modal window will present controls in the form of fields for the user name and password, as well as button controls for "OK" and "cancel." These control fields may be recognized by the window control analysis step 292. An application may alternatively present an end-user license agreement (EULA) which will include a button or check box control indicating agreement to the EULA. Another control may be a pop-up menu presenting options from which a user is intended to select. Other known controls may be identified. These controls, when found, may be predictive of the classification of modal screenshot.

Using some or all of the above-described techniques, the window classification analysis engine 120 may be able to identify a modal screenshot with a calculated probability or confidence level in step 294. For example, where some or all of the above-described techniques reach the same prediction as to the identity of the modal screenshot, this may be considered the identity of the modal screenshot with an acceptably high confidence. Alternatively, where outputs of two or more of the above-described techniques are inconsistent, but one is highly conclusive (high confidence value) and another is not, the highly conclusive identification may be adopted. It is understood that the predictions from the above-described techniques may also be weighted differently in reaching the ultimate confidence level in the prediction in step 294.

The predictive outputs of one or more of the above-described techniques as to an identity of the modal screenshot, together with a quantitative confidence in the prediction, may be combined by an algorithm in any of a wide variety of methods to reach an ultimate prediction as to the identity of the modal screenshot. Moreover, it is understood that other techniques for identifying the modal screenshot may be used instead of or in addition to the above-described techniques.

Classifying (identifying) the modal window may be significant in that some modal windows, once identified, may be resolved by supplying the information requested in the modal window to the application. In addition to identifying the modal screenshot, another function of the window classification analysis engine 120 is to supply requested information when a modal window is identified with an acceptable confidence level. Returning to the flowchart of FIG. 2B, in step 238, the window classification analysis engine 120 receives the window classification. In step 240, the engine 120 checks whether the classification is an application launch error message. This type of classification is generally one that cannot be remedied, and is an indication that the application did not load properly. Thus, if a launch error message is identified, the results for the test of the launch of that application are set to 'FAILED" in step 242 and this result is stored by the service provider for reporting by the reporting engine 110. Control is then returned to the agent 132 on desktop 102 to look for further applications to test in the recipe in step 226 (FIG. 2A).

As noted, one type of modal screenshot which may be classified is one containing a EULA. In step 246, the engine 120 checks whether the modal screenshot contains a EULA. If so, the EULA window is removed in step 248 by supplying the requested information to the launched application. In this instance, the requested information may be to automatically check a control box or click a control button in the EULA window. Once the information is supplied, control is then returned to the agent 132 on the desktop 102 to see of the supplied information resolved the issue. A new screenshot of the desktop is taken in step 210 (FIG. 2A) and the process continues again to determine whether the new screenshot is a clean screenshot or modal screenshot.

Another type of modal window which may be identified in the modal screenshot is a splash screen. In particular, during the loading of an application upon launch, one or more intermediate screens may be displayed. These splash screens may include an image, a logo, the current version of the software, the software publisher, etc. In step 252, the engine 120 checks whether the modal screenshot has a splash screen or other introductory message. If so, the splash screen is removed in step 254, for example by simply waiting or by causing a control character for carriage return to be supplied to the launched application. Once the splash screen is removed, control is then returned to the agent 132 on the desktop 102 in step 210 to see of the issue has been resolved.

As noted, another type of modal screenshot which may be classified is one requesting control field values. For example, the application may be looking for a user name and password, authentication code or other text string. In step 256, the engine 120 checks whether the modal screenshot is looking for control field values. The field values may be supplied in one of two ways. The requested field values may be stored in memory, either on one of the desktops 102, within the service provider 106 or elsewhere in a network-connected computing device. The engine 120 checks for stored field values in step 258 to provide to the application. If the values are found in step 263, the requested field values may be retrieved and supplied in step 268. Control is then returned to the agent 132 on the desktop 102 in step 210 to take a new screenshot to see if the issue has been resolved.

Where the engine 120 is unable to find stored field values to satisfy the control fields in step 262, the result status may be set to 'INPUT NEEDED' in step 266, and the user may be prompted to supply the requested field values before returning to step 226. In order to get the requested input, in one example, the window classification analysis engine 120 or agent 132 may generate a user interface to be presented to a user. In one example, the user interface may mimic the user interface within the application requesting the information, though it need not in further embodiments. This feature is described in greater detail below.

The above description relates to instances where a modal screenshot needing resolution was obtained in step 220 upon launching an application from the recipe. If a screenshot is instead a clean screenshot, the agent 132 on desktop 102 uploads the clean screenshot of the entire desktop, such as for example screenshot 140 shown in FIG. 1. The agent further captures the coordinates of any windows (142, 144) on the desktop. The captured screenshot and coordinates are uploaded to, and stored on, the service provider 106 in step 224 for evaluation.

Figure 4:
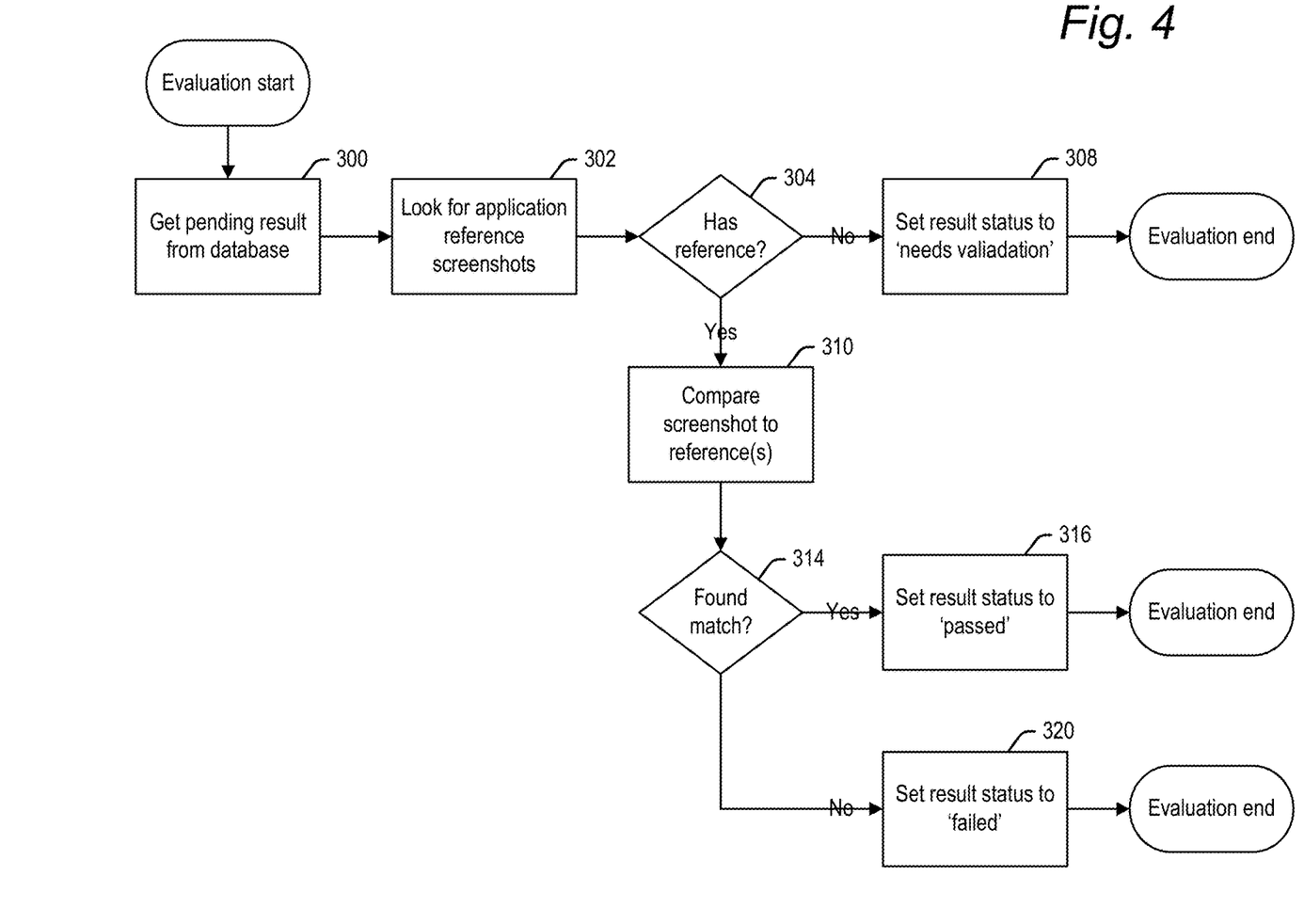
FIG. 4 is a flowchart illustrating further detail of the operation of the evaluation engine according to embodiments of the present technology.

FIG. 4 is a flowchart showing further details of the evaluation performed by the evaluation engine 116. In general, the evaluation process involves comparing the bitmap of the pending screenshot captured in step 224 against a number of screenshots, referred to herein as reference screenshots, stored in a memory within the service provider 106. The stored reference screenshots may be a large number of homepage screenshots from properly launched applications. The evaluation of the pending screenshot against the reference screenshots may take some time to complete. As such, the evaluation process may run in parallel with the other steps described above performed by the agent 132 on desktop 102, and in parallel with other engines such as the window classification analysis engine 120 on service provider 106.

In step 300, a screenshot pending for evaluation from the desktop 102 is retrieved from memory. It may happen that the service provider has no reference screenshots for comparison against a pending screenshot. This check is performed in step 302. If no reference screenshots are found in step 304, the status of the pending screenshot is set to 'NEEDS VALIDATION' in 308 and the evaluation ends until such time as reference screenshots are generated and/or uploaded to the service provider 106. In this instance, the user may accept or reject the screenshot manually. If the user accepts, the screenshot may be added to the collection of reference screenshots.

If reference screenshots are identified in step 304, the pending screenshot is compared against the reference screenshots in step 310. Any of a wide variety of known algorithms may be provided for comparing the bitmap pending screenshot against the bitmap reference screenshots. For example, a number of technologies exist for abstracting or summarizing bitmap data for the purposes of comparison and finding a match. One example is ImageMagick® computer software, but other software programs may be used instead of or in addition to this.

Each application that has been tested may have a list containing one or more reference screenshots stored for example in memory on service provider 106. When a new screenshot is added to the queue for evaluation, the name of the application and an ID are added to memory. Based on the application ID, the evaluation engine 116 knows which collection of reference shots to use.

It may happen that there are no reference screenshots available for that particular application. In that case the status is set to "NEEDS VALIDATION." As noted above, in this instance, the user may accept or reject the screenshot manually. If the user accepts, the screenshot may be added to the collection of reference screenshots.

If a reference screenshot is found that matches the pending screenshot, this is taken as a confirmation that the application has launched correctly. Thus, if a match to a pending screenshot is found in step 314, the status of the pending screenshot is set to 'PASSED' in step 316, and the evaluation ends. Alternatively, if no reference screenshot is found that matches the pending screenshot, this is taken as a confirmation that the application has not launched correctly. Thus, if a match to a pending screenshot is not found in step 314, the status of the pending screenshot is set to 'FAILED in step 320, and the evaluation ends.

As noted, the evaluation by evaluation engine 116 may take place in parallel with the operations of the application test agent 132 on the desktop 102 to upload a modal or clean screenshot. In step 226, after an application has been launched and a screenshot from that application has been uploaded, the application test agent 132 checks for additional applications in a recipe in step 226. If there are additional applications in a recipe, a next application in the recipe is launched in step 204 and the process begins again. If there are no additional applications in a recipe in step 226, the operation of the agent 132 is done in step 228 (until a new recipe is read from service provider 106 and the process by the agent 132 begins again at step 200).

The above description has provided an example of the functions performed by the application test agent 132 running on a desktop 102, and various engines including the window classification analysis engine 120 and evaluation engine 116 running on service provider 106. However, it is understood that one or more of the engines described above as being part of service provider 106 may instead be resident on and run from desktop 102. Likewise, it is understood that at least portions of the application test agent 132 may be resident on and run from service provider 106.

As noted above, if a pending screenshot is matched to a stored reference screenshot, this is taken as an indication that the application has launched correctly. This confirmation of a correct launch of the application is tied to the recipe in which that application was run. However, fact that the application launched correctly is not tied solely to that one recipe. In particular, it may happen that an application is part of more than one recipe. A reference screenshot taken from an application as part of one recipe will also be used to confirm proper execution of the same application if it is run from another recipe.

Figure 5:
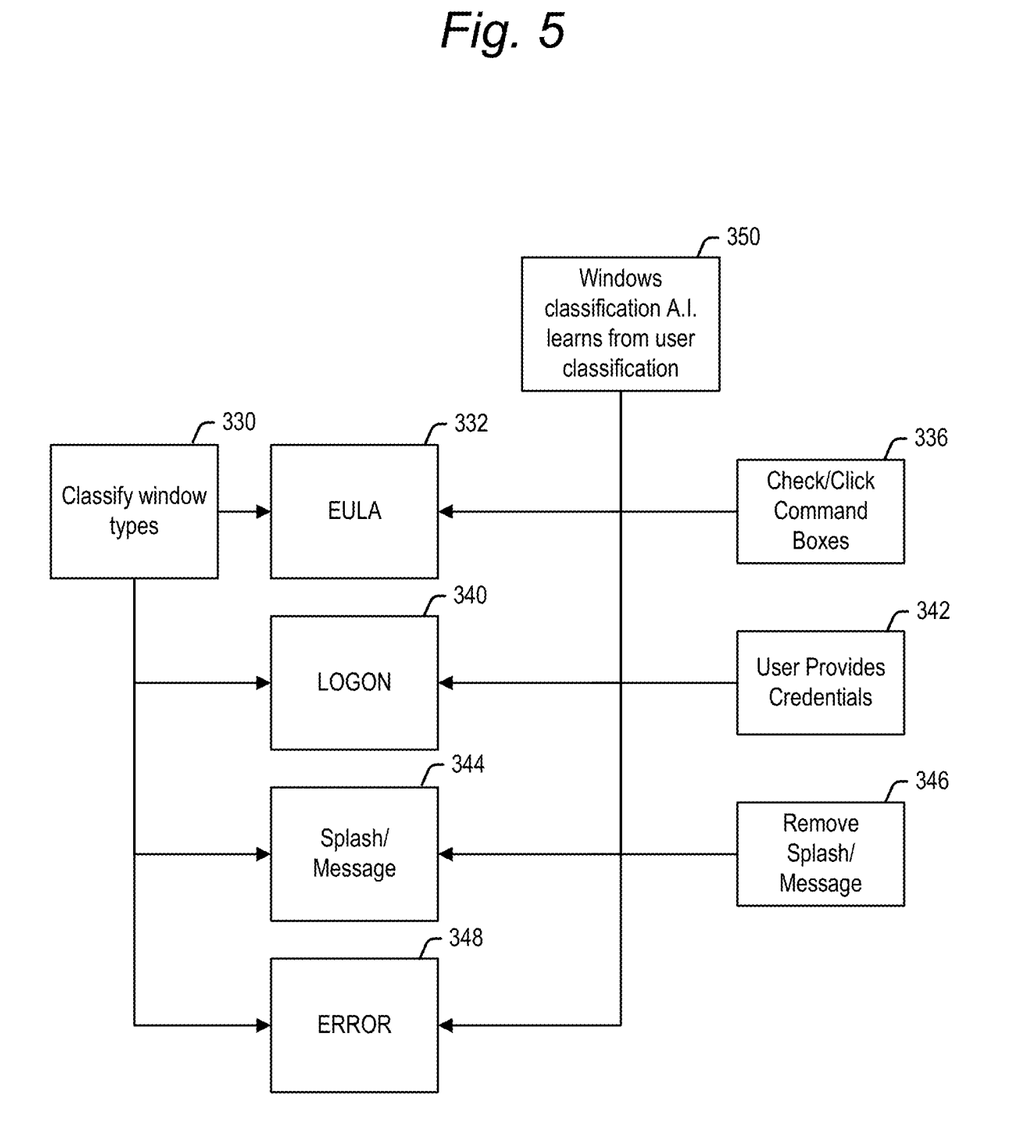
FIG. 5 is a flowchart of the user interaction with the analysis engine to clear modal screens and to provide a clean screenshot.

FIG. 5 is a flowchart showing interaction of a user and the system to resolve modal screenshots into clean screenshots. In step 330, the window classification analysis engine 120 provides its classification of the modal screenshot. In the event the modal screenshot is determined to include a EULA (step 332), the window classification analysis engine 120 may then provide the requested information to the application in step 336, for example by causing a check to be provided in a command checkbox, or by causing a click on a command click box. If additional or alternative information is requested, the user may be prompted to provide the information, or the information may be provided by the AI algorithm implemented by the window classification analysis engine 120 (step 350) as explained below.

In the event the modal screenshot is determined to include a logon screen (step 340), the window classification analysis engine 120 may then provide the requested information to the application in step 342, for example by causing the user's name and password to be provided in the command text boxes. If additional or alternative information is requested, the user may be prompted to provide the information, or the information may be provided by the AI algorithm implemented by the window classification analysis engine 120 (step 350) as explained below.

In the event the modal screenshot is determined to include a splash screen or message (step 344), the window classification analysis engine 120 may then remove the splash screen or message in step 346. Typically, the application will automatically proceed past this type of modal window upon passage of a period of time. The window classification analysis engine 120 may cycle through the flowchart of FIGS. 2A and 2B until such time as the splash screen or message is removed. Alternatively, the window classification analysis engine 120 may implement a pause and then return to check to see if the splash screen or message is removed. In the event information is requested in a splash screen or in response to a message, this information may be provided. For example, the user may be prompted to provide the information, or the information may be provided by the AI algorithm implemented by the window classification analysis engine 120 (step 350) as explained below.

In the event the modal screenshot is determined to include an error message (step 348), this goes to the ultimate issue of whether the application has launched correctly and will typically mean that it has not. Thus, in examples, no action is taken to resolve this type of modal screenshot. As indicated above, the status for that application is set to 'FAILED,' and the next application in the recipe is launched and the process continues anew. However, in embodiments, the system may attempt to resolve an error, depending on the error which is presented. For example, the user may be prompted to provide information in an attempt to resolve the error message, or the information may be provided by the AI algorithm implemented by the window classification analysis engine 120 (step 350) as explained below.

As noted, where the service provider 106 is unable to provide the requested information (from its own servers or other computing devices with which it is networked), the service provider 106 may generate a user interface requesting the user to provide the requested information. In embodiments, the user interface may mimic the actual modal window, recreating the look and feel of the modal window from the application that is requesting the information. The user interface need not mimic the modal window from the application in further embodiments.

The ability of the window classification analysis engine 120 to recognize modal windows and to provide requested information may improve over time through the AI algorithm. In particular, as the window classification analysis engine 120 encounters more modal windows, and is able to resolve the modal window, for example by user-provided information, the AI algorithm of the window classification analysis engine may learn how to automatically resolve this modal window the next time it is encountered. This optimizes the ability of the window classification analysis engine 120 to provide clean screenshots which may be evaluated by the evaluation engine 116 for a match as explained above.

Figure 6:
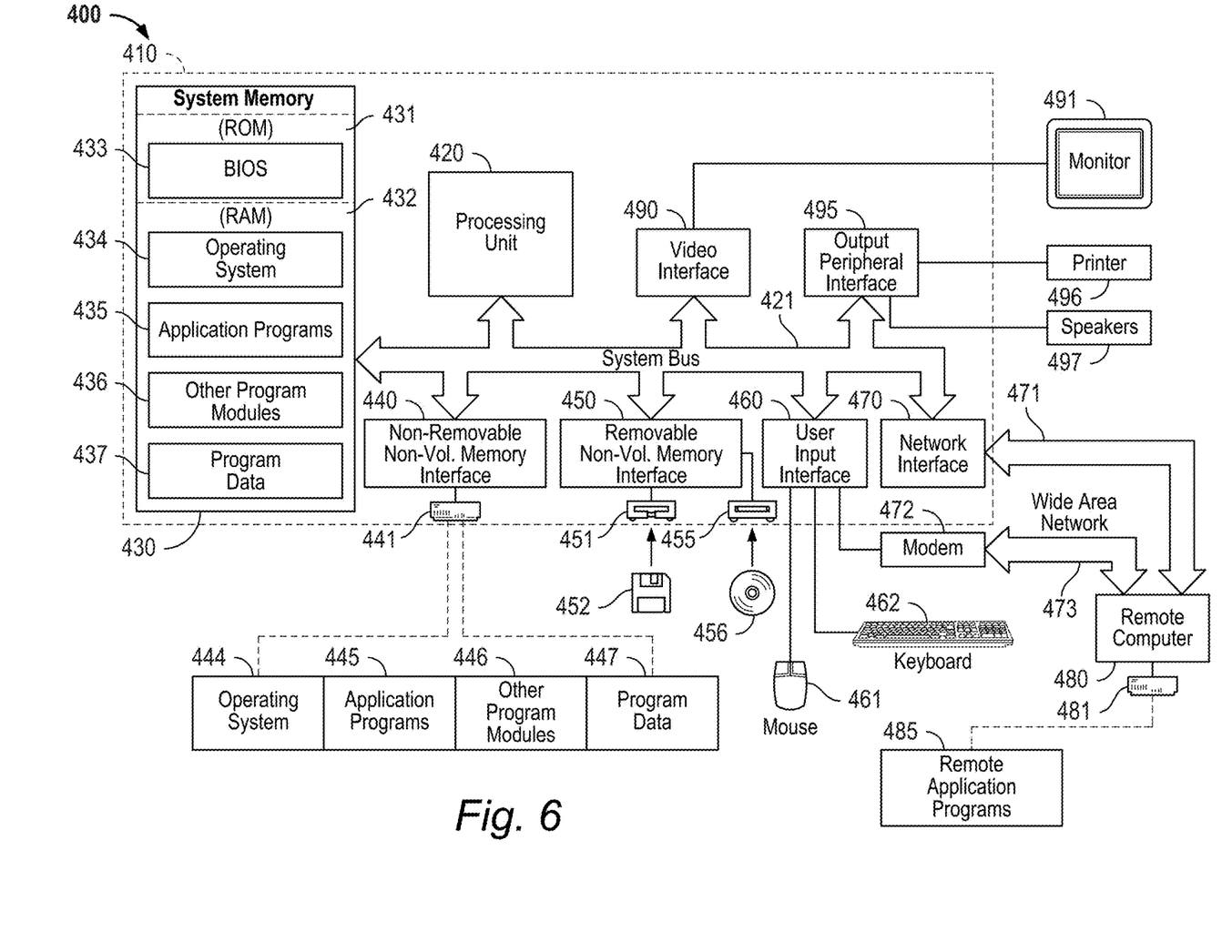
FIG. 6 is a block diagram of a computing system environment capable of implementing the present system.

A sample computing environment 400 for implementing the application test agent 132 and the engines of the service provider 106 is shown in FIG. 6. FIG. 6 shows a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 may include a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 430 includes computer storage media in the form of volatile and/or nonvolatile memory such as ROM 431 and RAM 432. A basic input/output system (BIOS) 433, containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 9 illustrates operating system 434, application programs 435, other program modules 436, and program data 437.

The computer 410 may also include other removable/non-removable, volatile/nonvolatile computer storage media. By way of example only, FIG. 9 illustrates a hard disc drive 441 that reads from or writes to non-removable, nonvolatile magnetic media and a magnetic disc drive 451 that reads from or writes to a removable, nonvolatile magnetic disc 452. Computer 410 may further include an optical media reading device 455 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 441 is typically connected to the system bus 421 through a non-removable memory interface such as interface 440, magnetic disc drive 451 and optical media reading device 455 are typically connected to the system bus 421 by a removable memory interface, such as interface 450.

The drives and their associated computer storage media discussed above and illustrated in FIG. 9, provide storage of computer readable instructions, data structures, program modules and other data for the computer 410. In FIG. 9, for example, hard disc drive 441 is illustrated as storing operating system 444, application programs 445, other program modules 446, and program data 447. These components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and a pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 9. The logical connections depicted in FIG. 9 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communication over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 9 illustrates remote application programs 485 as residing on memory device 481. It will be appreciated that the network connections shown are exemplary and other means of establishing a communication link between the computers may be used.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for testing launched applications on a desktop environment, comprising:
    (a) receiving a screenshot from a launched application;
    (b) analyzing the screenshot to determine whether it is a modal screenshot or a clean screenshot;
    (c) in the event the screenshot is determined to be a modal screenshot, determining whether the screenshot can be resolved; and
    (d) in the event the screenshot is determined to be a clean screenshot, evaluate the clean screenshot against stored reference screenshots to identify a match.

2. The method of claim 1, further comprising the step of repeating said steps (a) through (d) a second time in the event the screenshot is resolved upon performing said (c) a first time.

3. The method of claim 1, further comprising the step of prompting a user to provide information in the event the screenshot cannot be resolved in said step (c).

4. The method of claim 1, further comprising the step of classifying an application as having failed the launch test in the event the screenshot cannot be resolved in said step (c).

5. The method of claim 1, further comprising the step of classifying an application as having failed the launch test in the event a match for the screenshot is not found in said step (d).

6. The method of claim 1, further comprising the step of classifying an application as having passed the launch test in the event a match for the screenshot is found in said step (d).

7. The method of claim 1, wherein said step (c) comprises the step of analyzing the screenshot in order to classify or resolve the screenshot using a neural network.

8. The method of claim 1, wherein said step (c) comprises the step of performing sentiment analysis on text in the screenshot in order to classify or resolve the screenshot.

9. The method of claim 1, wherein said step (c) comprises the step performing keyword analysis on text in the screenshot in order to classify or resolve the screenshot.

10. The method of claim 1, wherein said step (c) comprises the step of performing a window control analysis on window controls appearing in the screenshot in order to classify or resolve the screenshot.

11. A system for testing launched applications on a desktop environment, comprising:
a memory; and
one or more processors configured to:
analyze a screenshot captured from a launched application determine whether the screenshot is a modal screenshot or a clean screenshot,
in the event the screenshot is determined to be a modal screenshot:
analyze the screenshot to classify the screenshot, determine whether the screenshot can be resolved in the event it is classified, and
in the event the screenshot is determined to be a clean screenshot, evaluate the clean screenshot against reference screenshots stored in the memory to identify a match.

12. The system of claim 11, wherein at least one of the one or more processors is located on a client-side device.

13. The system of claim 11, wherein at least one of the one or more processors is located on a server of a service provider.

14. The system of claim 11, the one or more processors further configured to receive and analyze a second screenshot from the application in the event the screenshot is resolved in said (c).

15. The system of claim 11, the one or more processors further configured to classify an application as having failed the launch test in the event a match for the screenshot is not found.

16. The system of claim 11, the one or more processors further configured to classify an application as having passed the launch test in the event a match for the screenshot is found.

17. The system of claim 11, wherein the one or more processors are configured to analyze the screenshot in order to classify or resolve the screenshot using a neural network.

18. The system of claim 11, wherein the one or more processors are configured to perform sentiment analysis on text in the screenshot in order to classify or resolve the screenshot.

19. The system of claim 11, wherein the one or more processors are configured to perform keyword analysis on text in the screenshot in order to classify or resolve the screenshot.

20. The system of claim 11, wherein the one or more processors are configured to perform a window control analysis on window controls appearing in the screenshot in order to classify or resolve the screenshot.

21. One or more processor readable storage devices having processor readable code embodied on the processor readable storage devices, the processor readable code for programming one or more processors to perform a method of:
(a) analyzing a screenshot received from a launched application to determine whether it is a modal screenshot or a clean screenshot;
(b) in the event the screenshot is determined to be a modal screenshot, determining whether the screenshot can be resolved; and
(c) in the event the screenshot is determined to be a clean screenshot, evaluate the clean screenshot against stored reference screenshots to identify a match.

22. The one or more processor readable storage devices of claim 21, the one or more processors further configured to classify an application as having failed the launch test in the event a match for the screenshot is not found.

23. The system of claim 11, the one or more processors further configured to classify an application as having passed the launch test in the event a match for the screenshot is found.

* * * * *

UNITED STATES PATENT AND TRADEMARK OFFICE
CERTIFICATE OF CORRECTION

PATENT NO. : 10,635,574 B1
APPLICATION NO. : 16/182314
DATED : April 28, 2020
INVENTOR(S) : Dennis Damen Page 1 of 1

It is certified that error appears in the above-identified patent and that said Letters Patent is hereby corrected as shown below:

In the Claims
Column 13, Line 15 (Claim 9, Line 2) please change "the step performing" to --the step of performing--
Column 13, Line 26 (Claim 11, Line 6) please change "application determine whether" to --application to determine whether--

Signed and Sealed this
Eighteenth Day of August, 2020

Andrei Iancu
*Director of the United States Patent and Trademark Office*